US009188737B2

(12) United States Patent
Joseph et al.

(10) Patent No.: US 9,188,737 B2

(45) Date of Patent: Nov. 17, 2015

(54) PHYSICAL TEXTURE DIGITAL DISPLAY SYSTEM

(71) Applicant: DISNEY ENTERPRISES, INC., Burbank, CA (US)

(72) Inventors: Daniel M. Joseph, Los Angeles, CA (US); David A. Shirley, Clermont, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 391 days.

(21) Appl. No.: 13/912,861

(22) Filed: Jun. 7, 2013

(65) Prior Publication Data

US 2014/0362348 A1 Dec. 11, 2014

(51) Int. Cl.
*G02B 6/06* (2006.01)
*G02B 6/08* (2006.01)

(52) U.S. Cl.
CPC .. *G02B 6/08* (2013.01); *G02B 6/06* (2013.01); *G02B 6/065* (2013.01)

(58) Field of Classification Search
CPC ............. G02B 6/06; G02B 6/065; G02B 6/08
USPC .......................................................... 385/116
See application file for complete search history.

(56) References Cited

U.S. PATENT DOCUMENTS 3,907,403 A * 9/1975 Maeda .................. H01J 29/892 313/372
4,247,165 A * 1/1981 Versluis ................... G02B 6/08 385/120
6,317,545 B1 * 11/2001 Veligdan .................. G02B 6/08 359/443
6,418,254 B1 * 7/2002 Shikata .................... G02B 6/06 385/115
6,487,351 B1 * 11/2002 Cryan ................... C03B 37/028 385/120
7,376,314 B2 * 5/2008 Reininger ................ G02B 6/06 385/116
8,308,329 B1 * 11/2012 Sethna .................... G09F 9/305 362/551
8,473,014 B2 * 6/2013 Wahlstrom ............... G02B 6/08 455/550.1
8,977,090 B2 * 3/2015 Lambert .................. G02B 6/06 385/116
2007/0230209 A1 * 10/2007 Martin .................... E04C 2/322 362/576
2014/0362348 A1 * 12/2014 Joseph ..................... G02B 6/08 353/28

* cited by examiner

*Primary Examiner* — Rhonda Peace

(74) *Attorney, Agent, or Firm* — Marsh Fischmann & Breyfogle LLP; Kent A. Lembke

(57) ABSTRACT

A display system for displaying images on a textured surface. The system includes a display device with a monitor having a screen operable to output light associated with still or animated images. The system further includes an optical block comprising a plurality of optical fibers bonded together to define parallel guide paths. First ends of the optical fibers define a first block surface and second ends of the optical fibers define a second block surface. The first block surface is positioned adjacent the screen to receive and transmit the output light along the guide paths to the second block surface. The system includes a textured display element covering the second block surface for receiving light exiting the second block surface and having a non-planar exterior surface emitting or projecting the received light. The textured display element has a body with an optical index matching that of the optical fibers.

34 Claims, 5 Drawing Sheets

DIGITAL DISPLAY DEVICE 120

PHYSICAL TEXTURE DIGITAL DISPLAY SYSTEM

BACKGROUND

1. Field of the Description

The present description relates, in general, to methods and systems for displaying imagery upon a textured or non-planar surface such as upon a rock or similar irregular surface, and, more particularly, to methods and systems that use an optical assembly or system to present images or light output from a display device on an offset and textured (or non-planar) image display surface.

2. Relevant Background

There are numerous outdoor and indoor settings where it is desirable to provide imagery on set or decorative features. Generally, the surfaces that are used to display images typically have been kept planar to achieve higher quality and undistorted displays, such as by projecting on a planar wall or screen or through a planar rear projection screen. However, there are many situations where a textured or irregular surface could be and preferably would be used to display images, such as in themed displays where it is desirable to provide images to provide information or to change the look of an object (e.g., use a surface of a rock or brick wall to display a character's image or to display personalized or changing text).

In the past, rear and front projectors have been used to project images on textured or irregular surfaces such as on a concrete or rock wall or through a transmissive object with a textured outer surface. Unfortunately, the use of projectors is problematic in many applications. For example, projectors typically have to be positioned a significant distance apart from the projection surface to provide higher quality images, and there are many settings where these focal distances cannot be accommodated or significant refurbishment or modification of a space or set is required, which can be time consuming and expensive. Also, projectors are maintenance intensive requiring lamp replacements, presenting heating concerns, and requiring mirror set up and adjustment.

There remains a need for a display system that can be used to present images to appear on a textured surface. Preferably, the images could be provided with a digital display device, such as a liquid crystal display (LCD) or the like, so as to not require use of a front or rear projector.

SUMMARY

The present description teaches a display system that is adapted to present images from a display device (e.g., an emissive display such as a digital display device) on an image display surface, which is a non-planar or textured surface. For example, the textured surface may have surface roughness similar to a rock material such as unpolished quartz or may be more irregular with peaks and valleys as found with rocks or similar materials in nature, as found in a brick or other man-made structure, and so on. The display system, thus, allows it to use the content provided to the emissive display device (e.g., an emissive device such an LCD, a light emitting diode (LED)-based display, or other digital or even a non-digital device) to create changing images, color, and animations on a display surface that has a truly physical or three-dimensional (3D) texture.

More particularly, a display system is provided for emitting images from a textured surface while disguising or hiding the presence of the source of such images (e.g., emitting light from what appears to be a rock or brick wall or the like). The system includes a display device with a monitor having a screen operable to output light associated with still or animated images (e.g., images and data content to present a personalized message to a park visitor or to present an advertisement that can be updated periodically).

The system further includes an optical block comprising a plurality of optical fibers bonded together to define parallel guide paths. First ends of the optical fibers define a first block surface and second ends of the optical fibers define a second block surface. The first block surface is positioned adjacent the screen to receive and transmit the output light along the guide paths to the second block surface. The system also includes a textured display element covering the second block surface with an interior surface, which receives the output light exiting the second block surface and a non-planar exterior surface opposite the interior surface emitting the output light received at the interior surface.

In some implementations, the textured display element has a body formed of a substantially transparent material with an optical index matching an optical index (i.e., index of refraction) of the optical fibers in the block. The body may be formed by positioning the block within a mold within surfaces defining the exterior surface of the textured display element, pouring a volume of liquid resin between the mold and the second surface of the block, and curing the resin such that the material of the body is bonded to the second surface without air gaps or spacing. The body may be formed such that it is relatively thin such as with a maximum thickness of 1 millimeter to limit distortion or other negative optical effects between a viewer and the second ends of the optical fibers.

The textured display element may also include a layer of transparent paint covering at least portions of the non-planar exterior surface, whereby the textured display element is substantially opaque to light striking the non-planar exterior surface while concurrently being at least translucent to the output light received at the interior surface. In these and other cases, the first and second block surfaces may be planar. In some implementations, though, the first block surface is planar and placed in abutting contact with the screen of the monitor of the display device while the optical fibers of the blocks are provided with two or more lengths such that the second block surface is non-planar (or textured or contoured). In such implementations, the textured display element may include a layer of transparent paint applied to the second block surface, whereby the textured display element is substantially opaque to light striking the non-planar exterior surface While concurrently being at least translucent to the output light received at the interior surface. The first block surface typically will be optically bonded to the screen of the monitor of the display device.

In the display system, the display device may be a digital display (such as an LCD, an LED-based display, or the like) emitting the output light from pixels of the screen. In these systems, the optical fibers preferably each have a diameter having a magnitude less than a maximum size of the pixels of the screen. The display system may also include a support or set element with an exterior surface and with a hole that extends through such a surface for receiving the textured display element and at least a portion of the block. In these display systems, the exterior surface of the support element can have a texture, and the non-planar exterior surface of the textured display element may have a texture matching the texture of the exterior surface of the support element. Transparent paint with coloring similar to the support element's exterior surface can be applied to hide the transparent body of the textured display element (and components behind it in the display system) and to blend the textured display element in with the surrounding materials of the support element.

DETAILED DESCRIPTION

Figure 1A:
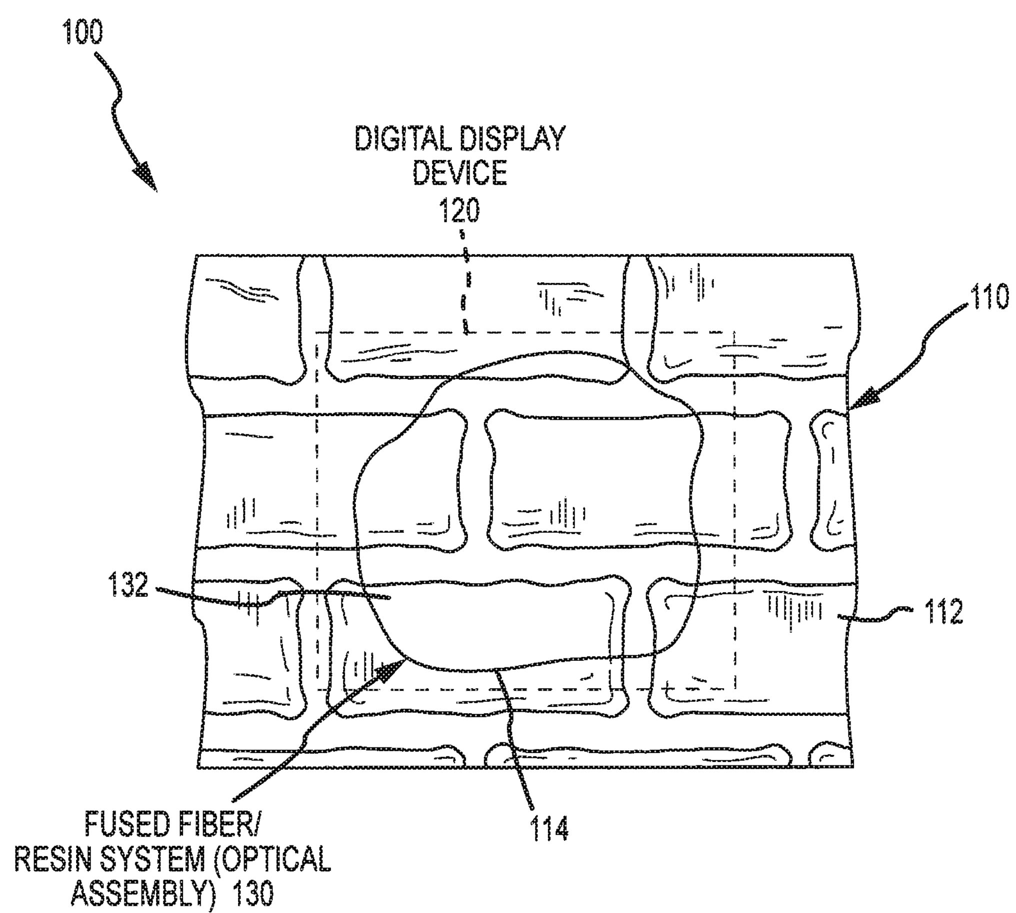
FIG. 1A illustrates a display system with an optical assembly with a textured display element combined with a fused fiber plate or block according to the present description operating in a first state (e.g., with a display device off or not operated to display an image)

The present description is directed toward methods and systems that use a plate or block formed of fused optical fibers ("fused fiber plates or blocks") to translate an output light or image from a first surface on digital display device or other display to a second surface, which may be planar or irregular/textured. The fused fiber plate or block may be inserted into or, in some cases, molded to a textured display element, and ends of the fibers in the plate/block may abut or be positioned proximate to an inner surface of the textured display element. In other words, the offset second surface to which the image is translated or presented by the optical fibers may be the inner side of the textured display element.

The textured display element may be formed of a transmissive material such as plastic, glass, ceramic, or the like, and its exterior surface ("image display surface" in this case) may be textured or non-planar. The exterior surface may further be coated or painted with a layer of material that causes it to be opaque (or substantially so) to light striking the exterior surface while it is transmissive to light from the optical fibers of the plate or block (e.g., transmissive when backlit). In other embodiments, the outer layer of material (transparent paint or the like) may be applied directly to the ends of the optical fibers of the plate/block.

The plate/block may be imbedded in the textured display element by positioning the plate/block within a mold with interior surfaces textured and shaped to define the exterior surface of the textured display element. A clear or transmissive material such as a plastic resin may be poured into the mold such that the ends of the fibers of the plate/block are molded to or mated with the interior surface of the textured display element with no air space. In some cases, the interior surface of the textured display element is planar, and the projection surface defined by the ends of the fibers of the plate/block is also planar (and sometimes polished and/or glossy to enhance the output display).

In other cases, though, the interior surface of the textured display element is contoured or textured similar to the exterior surface (e.g., the layer of transmissive material (or body of the element) defines a relatively constant offset such as 0.5 to 2 or more millimeters or the like). In such cases, the projection surface defined by the ends of the fibers of the plate/block are machined (e.g., cut or routed) to have a contour or texture matching (or similar to) the interior surface to provide contact with the second (or interior) surface or to at least limit (or even minimize) any air gap between the optical fibers and the body of the textured display element. The machining or routing of the fused fiber plate/block may be based on a scan of the surface texture (e.g., a relatively deep or varying texture such as one with depths of 1 to 5 mm or more from "peak" or high points of the projection surface). The physical texture of the textured display element enhances the believability of the display (e.g., the textured surface is the source of the image and hides the digital display device) and can even be touched by viewers in many implementations. Nearly any textured or contoured surface may be used such as those that can be created by a molding process, and the fabrication of the textured display element and fused fiber plate/block may leverage existing texture stamping techniques and sculpting techniques.

Together, the textured display element and the fused fiber plate/block can be thought of as providing a single optical system for translating a display output (image and/or light) from a first surface (e.g., exterior surface of a monitor) to a second surface offset some distance, and this second surface is typically non-planar (or textured or contoured). The optical system or assembly may be used with a standard digital display device such as an LCD, OLED, or the like, and the output surface of the display device is placed against or near to a first or receiving end of the fibers of the plate/block (which may be planar and/or polished (to be glossy)).

By using a digital display device, the display system can take advantage of the latest LCD/LED and other technologies. Digital display devices are much slimmer than projectors in most cases and can fit into most display environments more readily than rear or front projectors. Digital display devices have long lives and typically have much better color and contrast to give better images when compared with many projectors. Further, digital display devices generate less heat than projectors and are often less expensive and are easier to purchase, maintain, and replace. The use of fiber optics to translate the output image to a second surface (e.g., the exterior surface of the textured display element) is desirable, in part, because the image has minimal degradation such that the display system operates to provide a crisp and relatively sharp image.

Figure 1B:
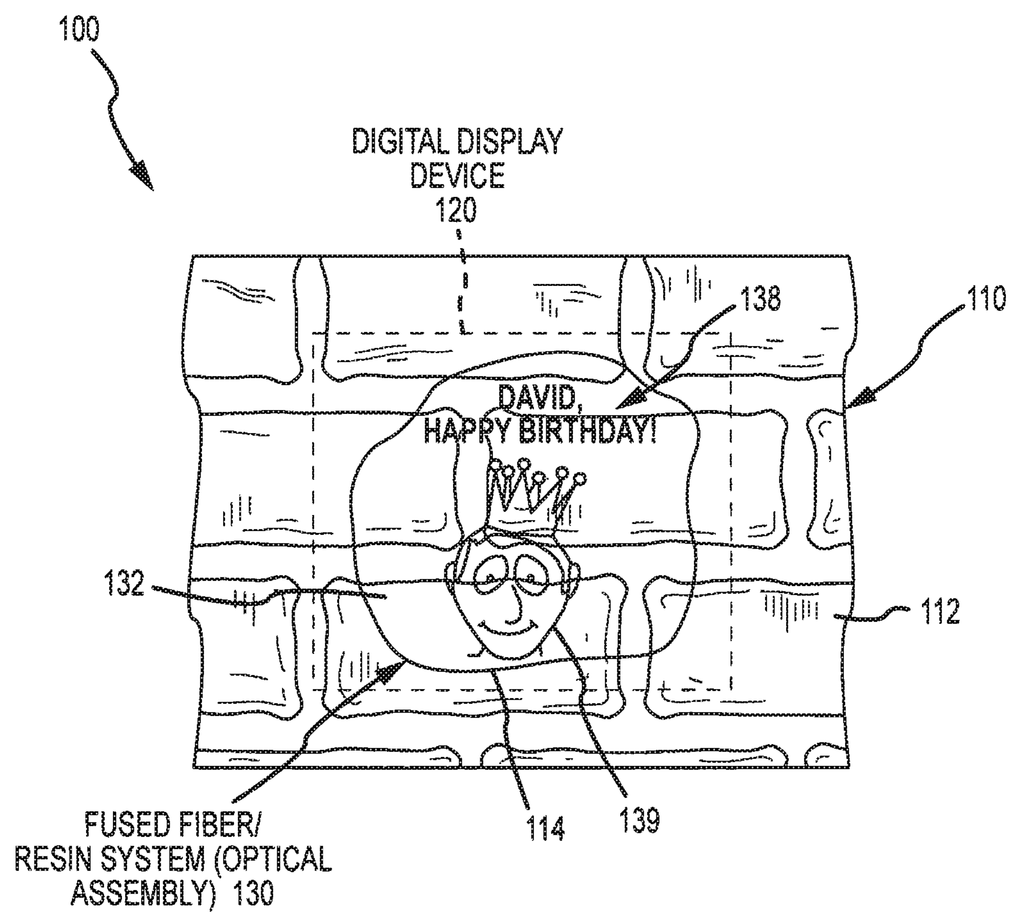
FIG. 1B illustrates the display system of FIG. 1A operating in a second state (e.g., with the display device on and operating to display an image made up of first portion providing text and a second portion providing a still or an animated character or other image(s))

FIGS. 1A and 1B illustrate a display system 100 of the present description that is operating in a first state and a second state, respectively. Particularly, in the first state shown in FIG. 1A, a digital display device 120 is "off" or operated to be dark and not display images (or light, colors, and so on). In the second state shown in FIG. 1B, the digital display device 120 is "on" or operated to display images as shown at 138 (with text or information being displayed that can be used to personalize the display system 100 to a viewer) and at 139 (with an image (still or animate) of a character or other object such as an image of the viewer or his favorite character in themed attire or celebrating a birthday or special event).

The light output from the digital display 120 is transmitted through an optical assembly or system 130 to be displayed, viewed, or visible to a viewer of the display system 100 as shown at 138, 139 on or via a textured or contoured exterior surface 132 of a textured display element of the assembly 130.

The light output from the digital display 120 is translated to this surface 132, which is offset a distance (e.g., 1 to many millimeters) from a monitor or output surface of the display device 120, by a fused fiber block of the optical assembly 130 as discussed below at least with reference to FIG. 2.

The display system 100 includes a support or set element 110 that is adapted in this example for structurally or physically supporting the optical assembly 130. Particularly, the support element 110 has a hole or portal 114 for receiving the optical assembly 130 and allowing the exterior textured surface 132 of the optical assembly to be exposed to a viewer and, typically, to be positioned adjacent to and, typically, substantially at the same level as the support element exterior surface 112. The support element 110 may be fabricated so that the exterior surface 112 is non-planar or is textured/contoured. For example, the support element 110 may be formed of rock, stone, tile, concrete, brick, plastic, or the like assembled into a wall or be formed of materials (e.g., plastics, ceramics, or the like) to replicate such a wall or structural feature. The support element 110, as a result, has rough surface 112 that has raised and recessed portions (e.g., is non-planar), and the support element 110 is typically opaque or at least not transparent. In this way, the support element 110 may receive the display element 120 and hide its existence from the viewer's sight shown by using dashed lines in FIGS. 1A and 1B to show the presence of the display element 120 behind the front or exterior surface 112.

To further disguise the presence of the display element 120, the optical assembly 130 is positioned within the portal or hole 114 in support element 110, and the textured exterior surface 132 of the textured display element is fabricated to have an appearance similar to that of the surrounding and adjacent exterior surface 112 even though it may be formed of a dissimilar material. Particularly, the surface 132 is textured or contoured in a manner that matches or is at least similar to that of the exterior surface 112. Further, the surface 132 may be provided by coating or applying a transparent resin body of the textured display element with a layer (or coat(s)) of transparent paint or similar material that is opaque or nearly so to exterior or environmental lighting striking the surfaces 132 but that is translucent to transparent when the optical assembly 130 is backlit by the display device 120. In this manner, the surface 132 blends in with the surround material of support element surface 112.

This effect is shown in FIGS. 1A and 1B in which the display system 100 is first operated with the display device 120 off or not showing images (not outputting light visible through the layer of material on surface 132) and then is second operated with the display device on or showing images 138, 139. The optical assembly 130 is configured to translate the output light of the display device 120 to the surface 132, and the shape (e.g., the shape of the outer periphery) of the fused fiber block (discussed with reference to FIG. 2 below) defines which portion or area of the monitor or output surface of the display device 120 is transmitted to the surface 132 (shown as an irregular circular shape in this example but nearly any shape may be used for the fiber fused block). Further, the content provided via the display device 120 may be masked so that light is only presented via portions of the optical assembly 130 such as the text/data portion 138 and the still or animated object portion or image 139. With the use of the display system 100, the true source (display device 120) of the imagery 138 and 139 is hidden, and the imagery 138 and 139 appears to be emitted from the textured surface 132.

Figure 2:
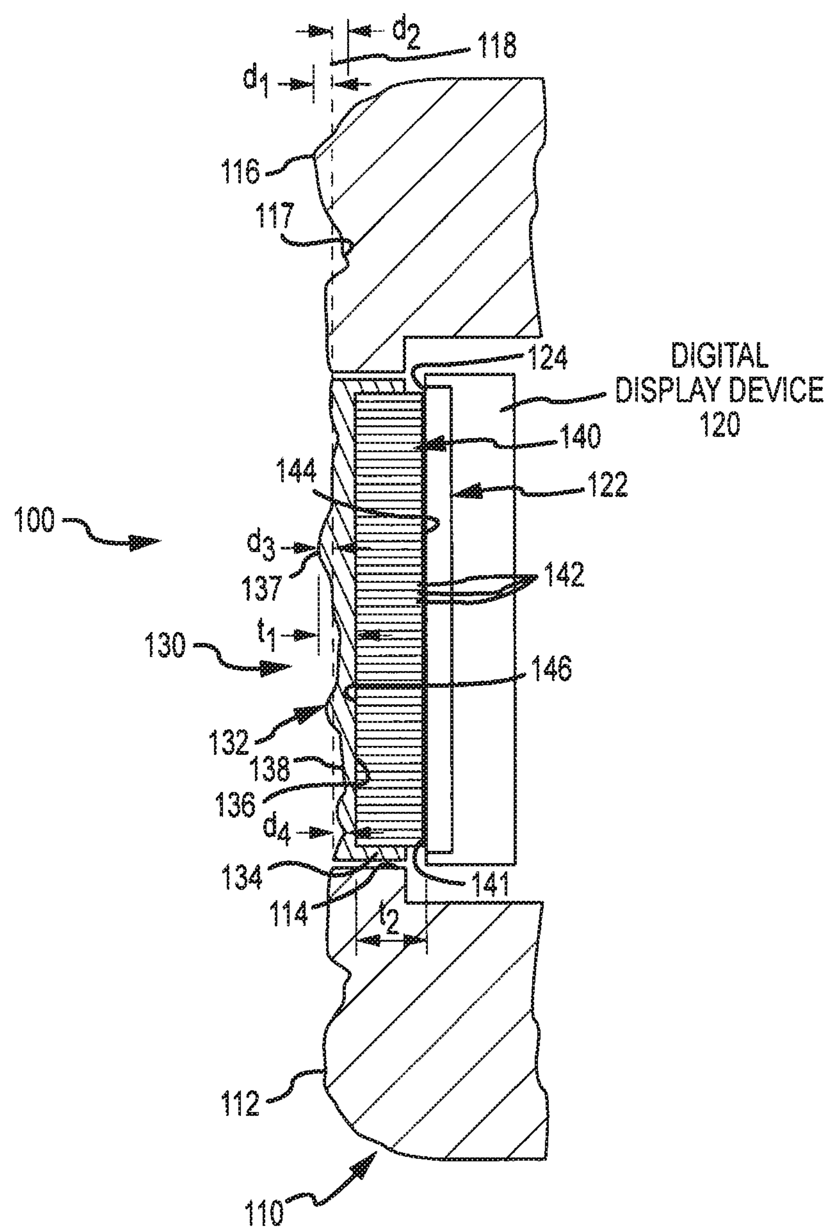
FIG. 2 is a side or end view of the display system of FIGS. 1A and 1B with a portion of a textured support or set element cut away to expose components of the optical assembly and the display device and a portion of the textured display element cut away to expose the fused fiber block.

FIG. 2 is a side or end view of the display system 100 of FIGS. 1A and 1B with a portion of a textured support or set element 110 cut away to expose components of the optical assembly 130 and the display device 120 and further with a portion of the textured display element cut away to expose a fused fiber block 140 of the optical assembly 130. The textured display element has a body 134 with a recessed surface 136 for receiving the fused fiber block or plate 140, and the body 134 extends over and about the fused fiber block 140. Opposite the recessed surface 136 on the body 134 of the textured display element is the textured exterior surface 132, which is shown with dashed line 118 to be in the same "plane" or about the same level as the exterior surface 112 of the support element 110 when the optical assembly 130 is inserted into the hole/portal 114 of the support element 110.

The body 134 may be formed of a transparent material such as a plastic, glass, or ceramic that is chosen to have the same optical index as the optical fibers 142 of the block 140 or to be within a range about this optical index (i.e., use a matching optical index to choose materials for the textured display element). In this way, the diffraction or other optical effects when light is passed from the block 140 to the body 134 are minimized or limited. Further, as shown in FIG. 2, recessed surface 136 is abutting (or nearly so) so as to avoid (or limit) an air gap between the block 140 and the textured display element, again to maintain the quality of the image/light transmitted from the display device 120 to the body 134 via the optical block 140.

As shown, the support element 110 has an exterior surface 112 that is contoured or textured such that it is non-planar. In this context, "non-planar" is meant to refer to a surface that has raised and/or recessed surfaces relative to a plane passing through a substantial portion of a surface or edge of an object. For example, a plane 118 is shown to extend generally through or along the exterior surface 112. However, the surface 112 is non-planar (i.e., textured or contoured) as there are one or more raised peaks or surfaces 116 that extend upward or outward from the plane 118 a distance, $d_1$ and also (in this non-limiting example) includes one or more recessed valleys or surfaces 117 that extend downward or inward from the plane 118 a distance, $d_1$. Distances, $d_1$ and $d_2$, may be the same or differ and typically have a value of 0.1 or more millimeters. Likewise, the exterior surface 132 of the textured display element of the optical assembly 130 is considered textured or non-planar because it includes raised surfaces/peaks 137 extending from the plane 118 a distance, $d_3$, and recessed surfaces/valleys 138 extending from the plane 118 a distance, $d_4$, in the opposite direction (which may be 0.1 to 3 or more millimeters).

The amount of texturing of the surface 132 may be selected to generally match that of the surface 112 such that the textured display element may appear to be formed of the same material as the support element 110 (e.g., not obvious that the body 134 is in the portal/hole 114 in element 110). To provide abutting contact and/or an optical connection with the fused fiber block 140, the body 134 may be formed of a clear material (such as a plastic resin) poured into a mold containing the block 140 (as discussed below). The surface 132, as discussed above, may be painted to have an appearance similar to that of exterior surface 112, e.g., to blend and match transition between materials of body 134 and support element 110. The paint or coating material provided on surface 132 may be chosen so as to be opaque from outer light but to allow the body 134 and surface 132 to be transmissive when backlit (e.g., when light from block 140 is directed onto the recessed surface 136 of the body 134 of the textured display element). For example, a transparent paint finish may be used for the surface 132, e.g., transparent paint or stain available from AquaTec Coatings and other distributors. The selectively transmissive surface may be provided with a light "dusting" of nearly any paint, but, in these cases, it may be useful to feather even this dusting of paint in with surrounded paint surface to blend in both off and on states. This can be challenging as it is often highly dependent upon the skill of the painter.

The display system 100 includes a digital display device 120, and this may take many forms to implement the system 100. For example, the display device 120 may be an off-the-shelf digital display or emissive display such as an LCD, an LED display, or the like. The display device 120 includes a monitor or screen 122 that is used to output image/light via a plurality of pixels, and the monitor/screen 122 has a planar (typically glass or plastic) output surface 124 that is positioned to face the optical assembly 130. In this manner, when the digital display device 120 is operated to output images, the associated light it outputs is emitted toward the optical assembly 130.

Significantly, the display system 100 includes the optical assembly 130, and the optical assembly 130 is configured to translate the light emitted from the monitor/screen surface 124 (a first surface) to the textured surface 132 (a second surface offset some predefined distance) with little or acceptable degradation in optical quality of the images provided by the emitted light from display device 120. To this end, the optical assembly 130 includes a block or plate 140 formed from a plurality (hundreds or thousands) of optical fibers 142. The optical fibers 142 are bound or fused together and are arranged to extend in a single direction or to have their longitudinal axes parallel so as to define numerous side-by-side and parallel light transfer paths. The material (such as plastic, glass, or the like) used for the fibers 142 may vary, but, as noted above, it is preferable for the material of the body 134 of the textured display element to be chosen to have an optical index (or index of refraction) that matches that of the fibers 142 (such as about 1.5 to 1.7 with 1.62 being common for some optical fibers). In general, "optical fiber" refers to a flexible, transparent fiber made of glass (silica) or plastic, slightly thicker than a human hair, and it can function as a waveguide, or "light pipe" to transmit light between the two ends of the fiber.

The block or plate 140 includes a first surface 144 that is proximate to the monitor/screen surface 124 and a second surface 146 opposite the second surface 144. The first and second surfaces 144 and 146 are made up of the tips or ends of the many fused fibers 142, such that light from the monitor/screen element 122 may enter the block 140 via surface 144 and exit out surface 146 after being guided in parallel paths by the optical fibers 142. The surfaces 144 and 146 may be polished and/or glossy to enhance optical coupling with the surfaces 124 and 136 (or at least surface 124 of the monitor/screen 122).

To further enhance optical coupling between the block 140 and the display device 120, the first surface 144 of the fused fiber block 140 may be placed in contact with the surface 124 with this abutting position retained such as in a mechanical or structural manner (e.g., with clamps or the like adjoining the optical assembly 130 to the display device 120). In other implementations or additionally, the block surface 144 is optically bonded to the planar surface 124 of the display device 120. This may be achieved as shown with a layer 141 of an optically clear adhesive film (such as optical bonding adhesive distributed by 3M and other distributers or manufacturers) or a layer of glue or epoxy suited for optical bonding of two components.

In the illustrated embodiment, the recessed surface 136 and the output surface 124 of the monitor/screen 122 are both planar and parallel to each other. Hence, the block 140 is formed of equal length fibers 142 that define the thickness, $t_2$, of the block 140, which may be 0.25 to 1 inch or more. The fibers 142 act to translate light from surface 124 to the recessed surface 136, and the fibers 142 are fused or bonded together to form what appears to be a solid block of glass or plastic. The diameter of the fibers 142 may vary to practice the system 100, but, preferably, the display system 100 will be more optically effective when the fibers have smaller diameters because the tighter the pitch the greater the resolution provided by the optical fiber block 140 and because there will then be little or no air spaces in block 140. In some implementations, the fibers 142 are chosen specifically to have diameters that are smaller than the diameters or sizes of the pixels of the screen/monitor 122. In this way, the fused fiber block 140 provides physical pixels that optically offset an image from one layer to another layer (e.g., from output surface 124 of monitor/screen 122 to recessed surface 136 of the textured display element).

The body 134 is then used to provide a textured surface 132 between the second surface 146 of the block 140 and a viewer. Again, the body 134 is formed of a transparent material, but the textured surface 132 is painted or coated with a material that is opaque until it is backlit by light output from the fibers 142 of the optical fiber block 140. In some settings, it is desirable for the image output from the surface 146 of the block 140 to be relatively close to a viewer as practical while still providing a desired amount of texturing or contouring with surface 132. In other words, the image has a better quality or less optical losses if the surface 146 provided by ends of fibers 142 is exposed or nearly so to a viewer. With this in mind, the portion of the body 134 that is positioned over the surface 146 of the block 140 (portion covering the block 140) is fabricated to have a relatively small thickness, $t_1$, such as less than about 1 millimeter (e.g., 0.25 to 0.75 mm or the like) as this provides enough material to match roughness or texturing of surrounding materials and surface 112 while not requiring light from fibers 142 to travel a large distance without the guidance of the fibers 142 (or physical pixels useful for offsetting the image of display device 120 a distance while retaining locations of pixels/light from screen/monitor 122).

In some embodiments, it may be desirable to provide a uniform thickness, $t_1$, of material between the optical block and the textured surface exposed to the viewer. For example, the thickness, $t_1$, in the optical system 130 of FIG. 2 will vary across the second surface 146 of the block 140 as varying thickness of the material of the body 134 of the textured display element is used to provide texture or a non-planar quality for surface 132. But, this may lead to some distortion and/or may not meet the desire for a particular display system to place the second surface 146 and ends of the fibers 142 as close as possible to the viewer.

Figure 3:
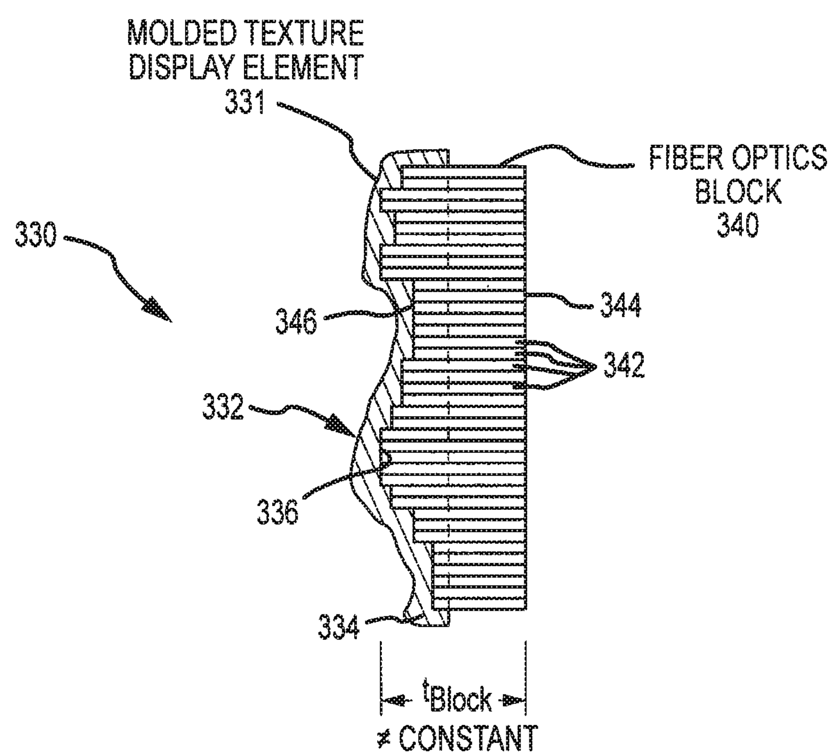
FIG. 3 is side or end view, similar to that of FIG. 2, of an optical assembly in which a plate or block formed of optical fibers has one of its surfaces machined to provide a textured surface over which a textured display element may be applied.

With the goal of minimizing this separation distance (or thickness, $t_1$), FIG. 3 illustrates another embodiment of an optical assembly 330 that may be used in a display system of the present description (such as system 100 of FIGS. 1A to 2). The optical assembly 330 includes a block 340 made up of a plurality of optical fibers 342, which may be bonded or fused tightly together in a parallel manner. The block 340 has a first side or surface 344 that is polished or glossy and planar, and the first surface 344 would be optically coupled to a planar surface of a monitor or screen of display device such as an LCD or the like. The fibers 342 act to guide the output light from each of the pixels of such a display device to an offset location associated with the second end of each of the fibers 342.

In contrast to optical block 140, the optical block 340 is fabricated so as to have a contoured or textured second surface (or projection/light-emitting surface) 346 rather than a planar surface. In other words, the fibers 342 do not have equal lengths and typically the fibers 342 will have 2 to 10 or many more different lengths to provide a texture that is matched to a surround material of a display assembly in which the optical assembly 330 is to be used. This results in the thickness, $t_{Block}$, of the block 340 varying across the second surface 346. The varying thickness, $t_{Block}$, may be achieved by first forming the optical block 340 with fibers of equal length being fused together, and, then, this block may be machined (e.g., with a router or other tool) to cut away varying lengths or segments of the fibers to provide the fibers 342 shown with a plurality of lengths (and a block 340 of varying thickness, $t_{Block}$).

The optical assembly 330 further includes a textured display element 331 that covers the textured or second surface 346 of the block 340. The textured display element 331 has a body (or a layer of material) 334 that is preferably opaque to exterior light but transmissive (e.g., translucent to transparent with more transparent being preferred in many optical assemblies 330) when backlit by light passing through the fibers 342 of the block 340. The body 334 is shown to have a uniform thickness (or a substantially uniform thickness) that may be less than 1 millimeter such as 0.1 to 0.5 millimeters or the like.

In some cases, the body 334 is provided by applying a coating or layer of transparent paint that is opaque to light striking the exterior, textured surface 332 but transparent to light striking an interior surface 336 (light emitted from block surface 346). In other cases, though, the body 334 of the textured display element 331 is provided by molding a volume of a clear resin such as a plastic resin over the machined/cut block 340. In still other cases, the body 334 is formed first, and the surface 346 is machined based on the contours of the interior surface 336, e.g., perform scan of surface 332, apply desired offset for thickness of material of body 334, and then cut (such as with a computer numerical control (CNC) router or the like) fibers 342 to form the textured, second surface 346 of the optical block 340.

As discussed above, the material used for the body 334 may be chosen such that the textured display element 331 has an optical index that matches that of the fibers 342 of the block 340. Such texturing of the projection surface of the optical block while using a thin layer of resin and/or transparent paint allows the optical assembly to be used provide a greater amount of offsetting without undesirable losses (as may be the case if the texturing were significantly larger in the optical assembly 130 of FIG. 3 in the body 134). The addition of a resin or other layer may be useful, though, to achieve a wider variety of appearances and textures. Filling and further shaping, in addition to the machining/router cutting, may be performed to achieve desired final shapes of the surface 132 (e.g., use a clear resin to achieve a desired look and feel).

The optical assemblies described herein, including assembly 130 and 330, may be fabricated using a variety of processes and techniques. For example, a plate or block of fused optical fibers may be a obtained (fabricated or purchased as an off-the-shelf or special order to have a desired thickness and perimeter shape) with first and second surfaces that are parallel and polished/glossy (e.g., the block 140 shown in FIG. 2). Then, this optical block of fibers may be positioned in a mold and a resin or epoxy for a textured display element may be poured into the space between the second surface of the block and the interior surfaces of the mold (with the first surface of the block covered or otherwise blocked off from the resin/epoxy flow). The material is chosen to have an optical index that is the same as or matches the fibers of the block, and, as a result, the textured display element will be clear/transparent (or nearly so). The inner surfaces of the mold define the exterior, non-planar surface of the textured display element and the amount and type of texture, which is selected to match or be the same/similar to that of exterior surfaces of a support or set element that will receive and support the optical assembly.

A layer of a material (e.g., a transparent paint or the like) is then applied that is opaque to exterior light striking the exterior surface but is transmissive when backlit via the optical fiber block, and the material may be selected to have the same or a matching color as that of the surfaces of the nearby and surrounding material/surface of the support or set element. Casting or molding the textured display element is sometimes desirable as it can be used to obtain a very clear layer of material for defining the textured exterior surface for the optical assembly while avoiding (or limiting) an air gap between the interior or recessed surfaces of the textured display element and the second or projection surface of the fused fiber block. In this way, the fused fiber block, the layer of clear material of the textured display element, and the transparent paint layer act together as a single optical system (e.g., one with relatively small distortion at transitions due to elimination of spaces and one with materials of similar optical qualities including matching optical indexes).

Figure 4:
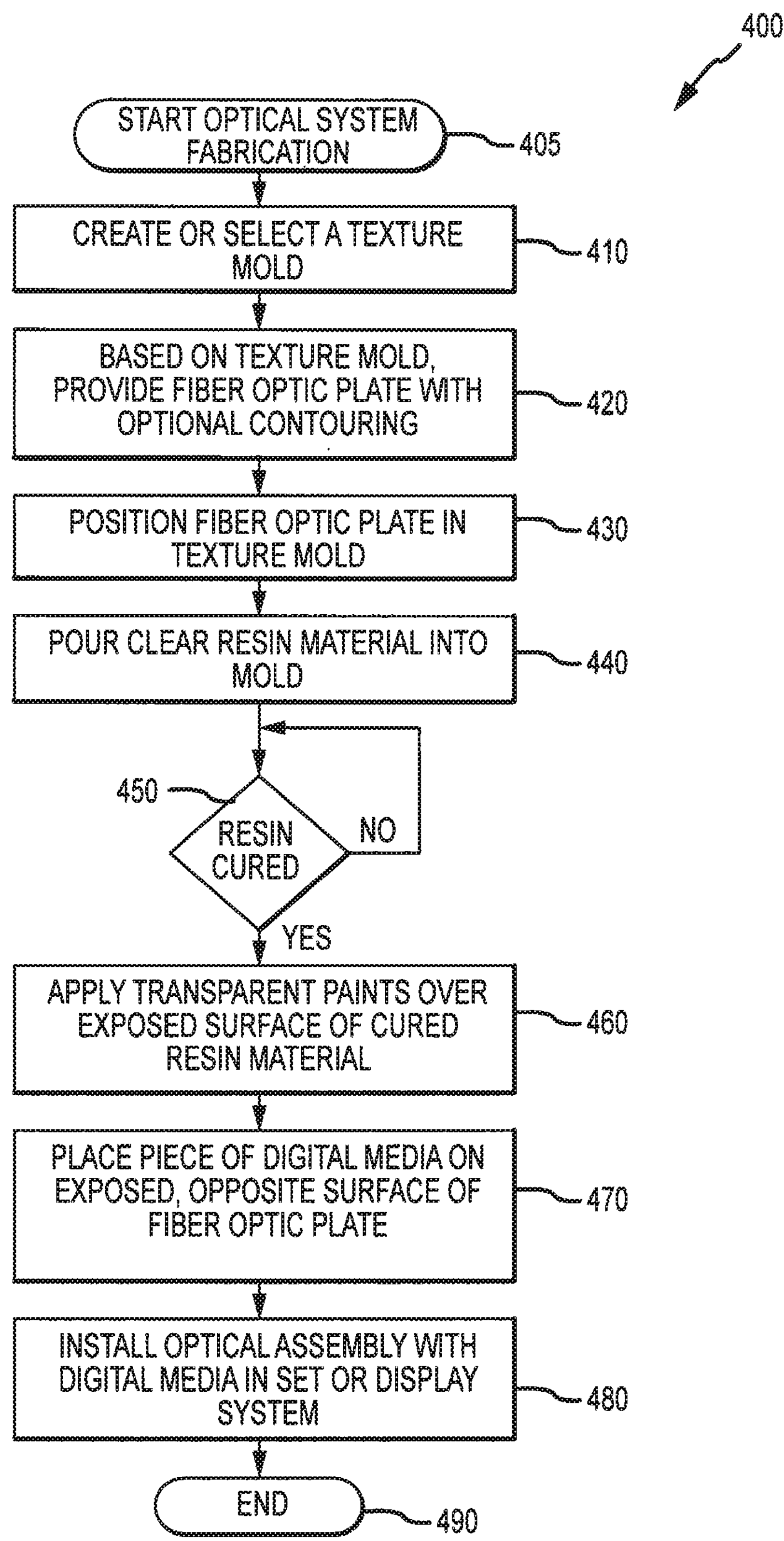
FIG. 4 is a flow chart of an exemplary process for fabricating a display system of the present description including forming an optical assembly.

FIG. 4 illustrates a method 400 of fabricating an optical system that can then be used in presenting a display to a viewer in which the source of an image or displayed content is hidden or disguised. The method 400 starts at 405 such as with identifying a location where it is desired to present imagery on a textured or non-planar surface. For example, an amusement park may include walls leading into a ride that are fabricated with rough surfaces such as to be formed of concrete, stone, brick, or the like or at least to have contoured outer surfaces. It may be useful to selectively cause images to be displayed on this non-planar, textured surface. To this end, a hole or portal may be created in a wall to receive an optical assembly of the present description. In other cases, a play or other entertainment set may have one or more contoured or non-planar surfaces where it is desirable to provide visual content, which can readily be updated and changed over time, and a location may be identified in this set for supporting an optical assembly of the present description.

At 410, the method 400 continues with creating or selecting a textured mold. The mold has interior surfaces that match a desired depth and peripheral shape of an optical assembly, and, more significantly, the interior surface of the mold also define a texture or roughness that will be provided on an exterior or textured display surface of the optical assembly. This mold may be fabricated or may be chosen from a number of available texture molds.

With this mold selected, a plate or block formed of optical fibers (as discussed above) may be provided (e.g., fabricated or purchased from commercial providers of such blocks) at 420. The fiber optic plate or block may be cut to have a particular external shape such as a rectangular shape, a circular shape, or the like to suit a portal/hole in a set or support element or to have a size and shape similar to that of the screen/monitor of a digital display device (e.g., to cover all or a subset of the area of the output surface of such a screen/monitor as shown in FIGS. 1A to 2). Further, one of the surfaces of the optical fiber block (e.g., the surface to be used as the projection or "second" surface as discussed above) may be machined such as with a CNC router to have a desired texture or non-planar shape (e.g., with fibers of two or more lengths rather than a uniform fiber length or block thickness).

At step 430, the method 400 continues with positioning the fiber optic plate within the recessed volume or space of the texture mold. Step 430 may involve rigging or supporting the fiber optic plate so that one of its surfaces (e.g., the contoured (or planar) projection surface) is proximate to the interior surfaces of the mold. For example, the projection surface of the fiber optic plate may be supported at an offset distance matching the planned thickness of the body of the textured display element away from the portion of the texture mold defining the exterior surface of this textured display element of the optical assembly. Careful attention may be given to this positioning to allow material to fill in over the projection surface of the fiber optic plate, and, in some cases, the mold is configured such that when the plate is properly positioned in the mold the interior or first surface of the plate (the surface to be optically bonded to the display device screen/monitor) is flush with edges of the mold or fill level of the mold (e.g., to have resin cover all of the sides of the fiber optic plate).

The method 400 continues then at 440 with a volume of clear resin material being poured into the mold to fill in around the fiber optic plate. The resin is allowed to cure in the method 400, and, at 450, the method 400 involves allowing the mold to sit until the resin is cured. If not, the method 400 continues at 450. The particular resin used may vary to practice the method 400, but, as discussed above, it may be desirable that the resin be chosen to produce, once cured, a solid material that is transparent (or substantially so) and with an optical index that matches that of the optical fibers of the plate (or within a predefined tolerance of such a value). In one embodiment, the inventors have found it useful to use FOCI Crystal Clear UV table top epoxy resin, but this is just one useful example of the types of resin that may be used in the pour step 440.

Once cured, the method continues at 460 with applying transparent paints over the exposed surface of the cured resin material (the material forming the body of the textured display element and providing the textured exterior surface of the optical assembly). The paints (or other covering materials) are selected to be opaque or nearly so and to have an appearance when dry similar to the material that will surround the textured surface once the optical assembly is installed for use (e.g., to be gray when adjacent slate, to be red when adjacent red brick, and so on). The painting 450 may involve feathering in the areas where the images from the display device are to be presented such that the resin remains more transparent when backlit in these areas. In areas outside or not over the fiber optic plate, standard paints may be used or blended in because transmission of light is not required for these areas of the textured display element. As with resin, the specific paint used may vary to practice the method 400. However, in one exemplary implementation of the method 400, the inventors used transparent glass paint available from Americana Crystal Gloss Enamels, with an optional top coat of varnish such as Golden Archival Varnish or the like.

At step 470, a piece of digital media such as an LCD may be placed against the exposed and planar surface of the fiber optic plate, and the two surfaces may be optically bonded using an adhesive or other optical joining material. The placing of the media at 470 may involve careful alignment of the surface of the monitor/screen with portions of the fiber optic plate such that locations of images displayed on the screen/monitor correspond with desired portions/areas of the fiber optic plate and, therefore, with areas of the exterior, textured surface opposite the digital media.

The optical assembly may then be installed at 480 within a set or display system, such as with the optical assembly extending through a hole or portal in a support element or wall to have the textured surface matching the location (or level/height) of the textured, non-planar surfaces of the surrounding materials. The method 400 may then end at 490, and the display system with the fabricated optical assembly may be operated to selectively present images (animated characters, text, still objects, and other content that may change over time) that appear to originate on or from the textured exterior surface of the optical assembly rather than from the true source (i.e., the placed piece of media such as an LCD or the like).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A display system, comprising:

a display device with a monitor having a screen operable to output light associated with still or animated images;

a block comprising a plurality of optical fibers bonded together to define parallel guide paths, wherein first ends of the optical fibers define a first block surface and second ends of the optical fibers define a second block surface and wherein the first block surface is positioned adjacent the screen to receive and transmit the output light along the guide paths to the second block surface; and a textured display element covering the second block surface with an interior surface receiving the output light exiting the second block surface and a non-planar exterior surface opposite the interior surface emitting the output light received at the interior surface, wherein the textured display element has a body formed of a substantially transparent material with an index of refraction matching an index of refraction of the optical fibers in the block.

2. The system of claim 1, wherein the body has a maximum thickness of 1 millimeter and wherein the interior surface is bonded to the second surface of the block without air gaps.

3. The system of claim 1, wherein the textured display element further comprises a layer of transparent paint covering at least portions of the non-planar exterior surface, whereby the textured display element is substantially opaque to light striking the non-planar exterior surface while concurrently being at least translucent to the output light received at the interior surface.

4. The system of claim 1, wherein the first and second block surfaces are planar and wherein the first block surface is optically bonded to the screen of the monitor of the display device.

5. The system of claim 1, wherein the first block surface is planar and placed in abutting contact with the screen of the monitor of the display device and wherein the optical fibers of the blocks are provided with two or more lengths whereby the second block surface is non-planar.

6. The system of claim 5, wherein the textured display element comprises a layer of transparent paint applied to the second block surface, whereby the textured display element is substantially opaque to light striking the non-planar exterior surface while concurrently being at least translucent to the output light received at the interior surface.

7. The system of claim 1, wherein the display device comprises a digital display emitting the output light from pixels of the screen and wherein the optical fibers each have a diameter having a magnitude less than a maximum size of the pixels of the screen.

8. The system of claim 1, further comprising a support element with an exterior surface and with a hole for receiving the textured display element and at least a portion of the block, wherein the exterior surface has a texture and wherein the non-planar exterior surface has a texture matching the texture of the exterior surface of the support element.

9. An optical assembly for use with a digital display device with a planar monitor screen, comprising:

a block of optical fibers, wherein first ends of the optical fibers define a first block surface and second ends of the optical fibers define a second block surface, wherein the first block surface is planar for mating with the planar monitor screen; and a textured display element comprising a layer of material covering at least the second block surface of the block with an interior surface adjacent the second block surface and exterior surface facing away from the block, wherein the exterior surface is textured and wherein the material of the layer is substantially transparent to light, and wherein the textured display element further comprises a layer of transparent paint covering at least portions of the textured exterior surface, whereby the textured display element is substantially opaque to light striking the textured exterior surface and is transmissive of light striking the interior surface.

10. The assembly of claim 9, wherein the second block surface is non-planar.

11. The assembly of claim 9, wherein the material of the layer in the textured display element has an index of refraction matching an index of refraction of the optical fibers.

12. The assembly of claim 9, wherein the layer of the material has a thickness less than about 1 millimeter.

13. The assembly of claim 9, wherein the interior surface of the layer of material is mated to the second surface of the block without air gaps therebetween.

14. A method for fabricating an optical assembly, comprising:

positioning a fiber optic plate within a mold with a surface of the fiber optic plate offset a distance from a mold surface defining a texture for an exterior surface of a textured display element;

pouring a volume of resin into the mold to at least partially fill a void between the fiber optic plate surface and the mold surface; and curing the resin to form a body of the textured display element, wherein the body is at least translucent to light.

15. The method of claim 14, wherein the body and fibers of the fiber optic plate have matching indices of refraction.

16. The method of claim 14, further comprising applying at least one coat of transparent paint to the exterior surface of the textured display element after the curing step.

17. The method of claim 14, further comprising machining the surface of the fiber optic plate prior to the positioning step such that the surface of the fiber optic plate is non-planar.

18. The method of claim 14, further comprising placing a digital media element against an exposed surface of the fiber optic plate opposite the surface of the fiber optic plate upon which the body of the textured display element is attached.

19. A display system, comprising:

a display device with a monitor having a screen operable to output light associated with still or animated images;

a block comprising a plurality of optical fibers bonded together to define parallel guide paths, wherein first ends of the optical fibers define a first block surface and second ends of the optical fibers define a second block surface and wherein the first block surface is positioned adjacent the screen to receive and transmit the output light along the guide paths to the second block surface; and a textured display element covering the second block surface with an interior surface receiving the output light exiting the second block surface and a non-planar exterior surface opposite the interior surface emitting the output light received at the interior surface, wherein the first block surface is planar and placed in abutting contact with the screen of the monitor of the display device and wherein the optical fibers of the blocks are provided with two or more lengths whereby the second block surface is non-planar, and wherein the textured display element comprises a layer of transparent paint applied to the second block surface, whereby the textured display element is substantially opaque to light striking the non-planar exterior surface while concurrently being at least translucent to the output light received at the interior surface.

20. The system of claim 19, wherein the textured display element has a body formed of a substantially transparent material with an index of refraction matching an index of refraction of the optical fibers in the block and wherein the body has a maximum thickness of 1millimeter and wherein the interior surface is bonded to the second surface of the block without air gaps.

21. The system of claim 19, wherein the textured display element has a body formed of a substantially transparent material with an index of refraction matching an index of refraction of the optical fibers in the block and wherein the textured display element further comprises a layer of transparent paint covering at least portions of the non-planar exterior surface, whereby the textured display element is substantially opaque to light striking the non-planar exterior surface while concurrently being at least translucent to the output light received at the interior surface.

22. The system of claim 19, wherein the first and second block surfaces are planar and wherein the first block surface is optically bonded to the screen of the monitor of the display device.

23. The system of claim 19, wherein the display device comprises a digital display emitting the output light from pixels of the screen and wherein the optical fibers each have a diameter having a magnitude less than a maximum size of the pixels of the screen.

24. The system of claim 19, further comprising a support element with an exterior surface and with a hole for receiving the textured display element and at least a portion of the block, wherein the exterior surface has a texture and wherein the non-planar exterior surface has a texture matching the texture of the exterior surface of the support element.

25. A display system, comprising:

a display device with a monitor having a screen operable to output light associated with still or animated images;

a block comprising a plurality of optical fibers bonded together to define parallel guide paths, wherein first ends of the optical fibers define a first block surface and second ends of the optical fibers define a second block surface and wherein the first block surface is positioned adjacent the screen to receive and transmit the output light along the guide paths to the second block surface; and a textured display element covering the second block surface with an interior surface receiving the output light exiting the second block surface and a non-planar exterior surface opposite the interior surface emitting the output light received at the interior surface, wherein the display device comprises a digital display emitting the output light from pixels of the screen, and wherein the optical fibers each have a diameter having a magnitude less than a maximum size of the pixels of the screen.

26. The system of claim 25, wherein the textured display element has a body formed of a substantially transparent material with an index of refraction matching an index of refraction of the optical fibers in the block and wherein the body has a maximum thickness of 1 millimeter and wherein the interior surface is bonded to the second surface of the block without air gaps.

27. The system of claim 25, wherein the textured display element has a body formed of a substantially transparent material with an index of refraction matching an index of refraction of the optical fibers in the block and wherein the textured display element further comprises a layer of transparent paint covering at least portions of the non-planar exterior surface, whereby the textured display element is substantially opaque to light striking the non-planar exterior surface while concurrently being at least translucent to the output light received at the interior surface.

28. The system of claim 25, wherein the first and second block surfaces are planar and wherein the first block surface is optically bonded to the screen of the monitor of the display device.

29. The system of claim 25, wherein the first block surface is planar and placed in abutting contact with the screen of the monitor of the display device and wherein the optical fibers of the blocks are provided with two or more lengths whereby the second block surface is non-planar.

30. The system of claim 25, further comprising a support element with an exterior surface and with a hole for receiving the textured display element and at least a portion of the block, wherein the exterior surface has a texture and wherein the non-planar exterior surface has a texture matching the texture of the exterior surface of the support element.

31. An optical assembly for use with a digital display device with a planar monitor screen, comprising:

a block of optical fibers, wherein first ends of the optical fibers define a first block surface and second ends of the optical fibers define a second block surface, wherein the first block surface is planar for mating with the planar monitor screen; and a textured display element comprising a layer of material covering at least the second block surface of the block with an interior surface adjacent the second block surface and exterior surface facing away from the block, wherein the exterior surface is textured and wherein the material of the layer is substantially transparent to light, and wherein the material of the layer in the textured display element has an index of refraction matching an index of refraction of the optical fibers.

32. The assembly of claim 31, wherein the second block surface is non-planar.

33. The assembly of claim 31, wherein the layer of the material has a thickness less than about 1 millimeter.

34. The assembly of claim 31, wherein the interior surface of the layer of material is mated to the second surface of the block without air gaps therebetween.

* * * * *